US008291691B2

(12) United States Patent
Spear et al.

(10) Patent No.: US 8,291,691 B2
(45) Date of Patent: Oct. 23, 2012

(54) MULTI-FUNCTIONAL PULSE-DIVIDED ROCKET

(75) Inventors: Guy B. Spear, Marshall, VA (US); Katherine L. Clopeck, Medfield, MA (US); Richard T. Brown, Manassas, VA (US); Michael Digiacomo, Warrenton, VA (US); William M. Wallace, Warrenton, VA (US)

(73) Assignee: Aerojet-General Corporation, Sacramento, CA (US)

( * ) Notice: Subject to any disclaimer, the term of this patent is extended or adjusted under 35 U.S.C. 154(b) by 1261 days.

(21) Appl. No.: 12/041,797

(22) Filed: Mar. 4, 2008

(65) Prior Publication Data

US 2011/0167794 A1 Jul. 14, 2011

Related U.S. Application Data

(60) Provisional application No. 60/953,634, filed on Aug. 2, 2007.

(51) Int. Cl.
*F02K 9/28* (2006.01)

(52) U.S. Cl. ................ 60/250; 60/234; 60/245; 60/254; 60/229

(58) Field of Classification Search ............ 60/253–256, 60/250, 234, 245, 219, 201, 229
See application file for complete search history.

(56) References Cited

U.S. PATENT DOCUMENTS 3,568,448 A * 3/1971 Webb .............................. 60/250
3,724,217 A * 4/1973 McDonald ...................... 60/254
3,879,942 A 4/1975 Dorn et al.
4,023,355 A 5/1977 McDonald
4,817,377 A * 4/1989 Kirschner et al. .............. 60/225
4,829,765 A 5/1989 Bolieau et al.
5,613,358 A 3/1997 Humiston et al.
2005/0120703 A1 6/2005 Rohrbaugh et al.

FOREIGN PATENT DOCUMENTS

FR 2805855 A1 9/2001

* cited by examiner

*Primary Examiner* — Ted Kim
*Assistant Examiner* — Andrew Nguyen
(74) *Attorney, Agent, or Firm* — Kilpatrick Townsend & Stockton LLP.; M. Henry Heines

(57) ABSTRACT

A multi-pulse rocket is equipped with a thermally insulating barrier that serves as a rupture disk or a movable plug or plate separating staged propellant grains. When a rupture disk it used, the disk can be equipped with a pyrotechnic actuator to weaken the disk upon command, enabling the propellant grain on the fore side of the disk to burst the disk at a relatively low pressure when ignition of the propellant grain is needed for additional thrust. Rupturing of the disk can also be controlled by attitude maneuvering ports on the fore side of the barrier whose open or closed conditions are controlled by independently operable closures. When a movable plug is used, the plug is movable between a closed position separating rocket chamber into subchambers isolating the propellant grains from each other and an open position allowing the flow of combustion gas between the two subchambers to achieve additional axial thrust. In all cases, the barrier when intact serves to contain both propellant grains regardless of whether one or both is ignited. The propellant grain on the fore side of the barrier can thus be used for either axial thrust augmentation or for attitude maneuvering.

4 Claims, 7 Drawing Sheets

51 63 53 55 54 52 66 65 67 64 62 57 56 GUIDANCE AND CONTROL 68

MULTI-FUNCTIONAL PULSE-DIVIDED ROCKET

CROSS-REFERENCE TO RELATED APPLICATION

This application claims the benefit of U.S. Provisional Patent Application No. 60/953,634, filed Aug. 2, 2007, the contents of which are incorporated herein by reference in their entirety.

BACKGROUND OF THE INVENTION

1. Field of the Invention

This invention resides in the field of rocket motors that contain two or more grains, with adjacent grains separated by a removable barrier.

2. Description of the Prior Art

Rocket motors with two or more propellant grains that are ignited individually are useful when a second or subsequent propulsive impulse is needed at an interval of time after the first propulsive impulse. Anti-aircraft missiles utilize the second impulse to provide extra velocity and to increase the maneuverability of a missile just before the missile intercepts a target. Missiles that are designed for both long and short range also benefit from successive pulse capability since the second pulse can either be fired simultaneously with the first for short-range missions or delayed for firing later in the missile trajectory for long-range missions, minimizing the peak velocity and thereby the drag on the missile. Rockets offering two or more pulses are also useful for missiles whose maximum velocity is limited due to structural or thermal considerations, the individual pulses dividing the thrust by time intervals to prevent the velocity from exceeding the maximum.

The capability of successive pulses can be built into a rocket motor in a variety of ways. One way is to equip the rocket motor with separate combustion chambers, each chamber having a separate nozzle. Another is to divide the rocket motor chamber into separate subchambers separated by an interstage bulkhead with one or more orifices blocked by a plug that is ejected when the igniter in the second or subsequent subchamber is fired. A third way is to equip the rocket motor with two radial-burning propellant charges separated by an insulating barrier that is opened when the second propellant charge is fired. The most common way of achieving successive pulses however is by the use of a multi-stage rocket motor in which separate rocket components are individually ignited and then jettisoned after use. A disadvantage of a multi-stage rocket motor is that the aft end components of the guidance system, such as nozzles and fins, are also jettisoned. Successive pulses can also be achieved in a single-chamber rocket motor by the inclusion of an insulated end-burning or center-perforated second stage that is separated from the initial burning stage by a frangible barrier that is ruptured when the second stage is ignited. The present invention is an improvement on such a single-stage rocket motor.

Of further relevance to this invention are rocket motors and other flight vehicles with thrust vectoring capability. Flight vehicles are often fired at targets that are maneuverable and thereby capable of evading the vehicles. Many targets are also capable of firing back at a flight vehicle as the flight vehicle approaches. Thrust vectoring, or attitude maneuverability, provides the flight vehicle with the ability to respond to both such target maneuvers, i.e., to maintain its aim toward the target, to avoid being fired upon, or both. One method of achieving attitude maneuverability is by the use of side-facing thrusters, also known as "divert motors," that are controllable independently of the forward-thrusting propellant.

SUMMARY OF THE INVENTION

The present invention resides in a single-chamber, multi-grain rocket motor that functions both as a multi-stage rocket motor and as a rocket motor with an additional function such as thrust vectoring. Like certain rocket motors of the prior art, the rocket motor of this invention contains two or more grains arranged along the longitudinal axis of the motor chamber with adjacent grains separated by a thermally insulating barrier. The barrier undergoes a transition from a "closed condition," in which the barrier isolates the adjacent grains from each other, and an "open condition," in which the barrier is actuated i.e., its barrier function is compromised or removed to allow the fore-side grain to supply forward thrust to the rocket motor, and this transition is controlled by one or more mechanisms external to the chamber. Each condition constitutes a distinct mode of operation of the rocket motor. In certain embodiments of the invention, ignition of the fore-side grain contributes to or completes the transition, but the transition can be blocked, or the blocking effect removed, or both, independently of the ignition of the fore-side grain. This is distinct from rocket motors of the prior art in which the transition from the closed condition of the barrier to its open condition is directly and solely caused by the ignition of the fore-side grain. The fore-side grain can thus be used either for axial thrust, such as to add to the axial thrust of the aft-side grain, when the barrier is actuated, or for other purposes such as attitude maneuvering when the barrier is not actuated. Actuation of the barrier or blocking of the actuation, in either case independently of the ignition of either grain, can be achieved at the command of a missile guidance and control system, thus allowing the system to be programmed for each of the alternative purposes.

Actuation of the barrier in accordance with this invention can be achieved by rupturing or weakening of the barrier sufficiently to allow thrust from the fore-side grain to remove the barrier entirely and thereby add to the axial impulse of the motor. Alternatively, the barrier can be a movable plug or plate and actuation of such a barrier can be achieved by movement of the plug or plate between a closed position where the plug or plate fully closes off a portion of the rocket chamber and an open position where the plug or plate no longer closes the portion off but instead allows heat and combustion gas to pass freely. In either case, actuation of the barrier is achieved by an actuation mechanism that is independent of the ignition of the fore-side grain. The fore-side grain therefore need not generate a pressure high enough to rupture the barrier by itself, or to initiate rupture of the barrier, and a grain can be used that generates a lower pressure than would otherwise be needed. Conversely, a stronger barrier, one that would allow ignition of the fore-side grain without rupture and hence one with a higher margin of safety, can also be used. These advantages are in addition to the advantage of providing the rocket motor with the option of choosing between thrust augmentation and attitude maneuvering, or doing both.

In further embodiments of the invention, control of the barrier function is achieved by closures on one or more attitude maneuvering ports in the fore side of the barrier. The barrier in these embodiments is constructed in such a manner that it will rupture due to the pressure differential resulting from ignition of the fore-side propellant grain after a significant portion of the aft-side propellant grain has combusted, but only when the attitude maneuvering ports are closed sufficiently to contain the fore-side pressure caused by ignition of the fore-side grain. Rupture will not occur, however, when the attitude maneuvering ports are open to achieve attitude maneuvering, which will also relieve the pressure. Thus, the barrier in these embodiments is actuated (i.e., ruptured) by the combined effect of the closed position of the port closures and the ignition of the fore-side grain. Attitude maneuvering by the fore-side grain will occur when the ports are open, with no contribution to the forward thrust, whereas a forward thrust effect of the fore-side grain, with no attitude maneuvering, will occur when the ports are closed. The condition of the port closures is controlled externally to the chamber by the guidance and control system.

In still further embodiments of the invention that utilize ignition of the fore-side grain, the barrier is a flap or a generally hinged closure that is held in a closed position by a catch or bolt that is releasable or removable by an impulse that is externally controlled. Once the hinged closure is no longer held closed by the catch or bolt, ignition of the fore-side grain will cause the flap to open. A catch can be operated by any remotely operated mechanism, one example of which is a solenoid. The bolt can be an explosive bolt that can be released by remotely operated detonation.

The term "actuation" is used herein to denote the action of rupturing, opening, or removing the barrier, or the action of increasing the susceptibility of the barrier to rupture so that the threshold pressure differential that will cause rupture of the barrier is lowered, or the action of removing obstacles that would otherwise prevent the barrier from opening or rupturing upon ignition of the fore-side grain. The terms "fore-side grain," "fore propellant grain," and "fore grain" are used interchangeably to denote the grain on the side of the barrier closest to the fore end of the rocket motor chamber. This grain will be ignited subsequent to the grain on the opposing side of the barrier, i.e., the aft side, the grain on the aft side in most cases being the grain producing the initial thrust. The term "divided rocket" or "divided rocket chamber" is used herein to denote a rocket chamber divided into two or more sections, each section containing propellant and capable of producing a separate pulse, and each pair of adjacent sections separated by a barrier, with each barrier capable of being actuated independently of both the propellant grains and the other barriers. The term "attitude maneuvering" is used interchangeably with "thrust vectoring" and both terms denote the expulsion of combustion gas from the rocket motor at a location on the motor and at an angle relative to the longitudinal axis of the motor that cause turning, i.e., a change of direction, of the motor by rotation of the longitudinal axis of the motor. The term "thermally insulating," used herein to describe certain barriers of the present invention, denotes that a barrier inhibits heat transfer, i.e., reduces the rate of heat transfer sufficiently to avoid the propellant grain on the relatively cool side of the barrier from reaching its ignition temperature.

DETAILED DESCRIPTION OF THE INVENTION AND PREFERRED EMBODIMENTS

Figure 1:
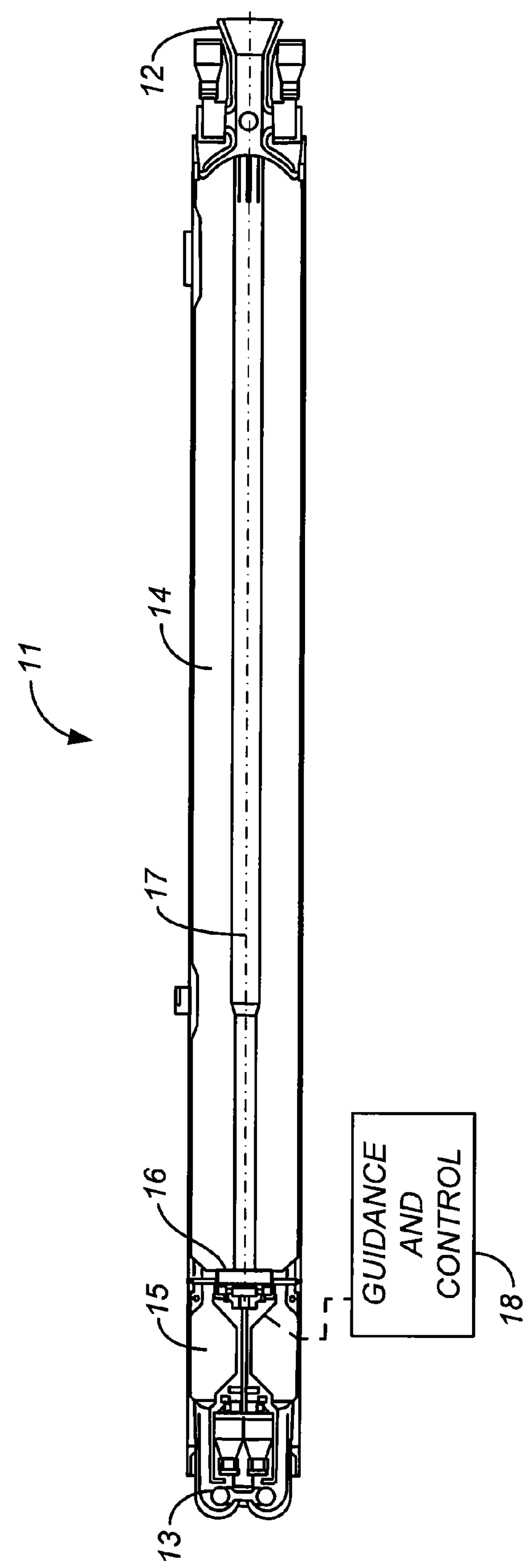
FIG. 1 is a lateral cross section of a divided rocket motor within the scope of the present invention, the motor containing a rupturable barrier assembly.

One type of barrier actuator for use in the practice of the present invention is a device that will rupture by its own action a rupturable or frangible barrier sufficiently to remove the barrier entirely or to produce an opening in the barrier that will allow sufficient flow of combustion gas to produce axial thrust or add significantly axial thrust to axial thrust resulting from combustion of the aft-side propellant grain. Another type of actuator is a device that will produce a small rupture in the barrier that is readily widened to fully open the barrier upon the imposition of a relatively low pressure differential. A third type of actuator is a plug that is movable in the axial direction, a fourth type is a plate or disk that is movable in the transverse direction, and fifth type of actuator is a remotely controlled catch or bolt in conjunction with a barrier that is a hinged flap. In the case of a plug, plate, or flap, the barrier will be a partition that marks the division between the sections of the rocket motor chamber and the plug, plate, or flap will seal against an aperture in the partition. For the rupturable barriers, preferred embodiments of each barrier will contain score lines along which the barrier will open and separate, and the actuator will break the barrier at a point along one of the score lines, or at a junction of intersecting score lines, to facilitate the tearing of the barrier along the score lines when the fore-side grain is ignited. In further preferred embodiments of these rupturable barriers, the small rupture caused by the actuator will cause the score lines to separate for a short distance, facilitating further tearing to achieve the separation along the full lengths of the score lines.

Actuators for these rupturable barriers can be energized by any of various remote-control means known in the art. Preferred actuators are pyrotechnic actuators or squibs, which are devices that are set off by an electric charge and that transform the energy that is pyrotechnically generated from the charge into motion to perform work against an external load, which in this case is the barrier. Pyrotechnic actuators include both mechanical actuators and actuators that generate both heat and particle emissions. Examples of mechanical actuators are piston actuators, bellows actuators, dimple actuators, and retractable actuators. Actuators of these types are commercially available from suppliers such as EaglePicher Technologies, LLC, Joplin, Mo., USA. Certain actuators contain pistons that terminate in javelins or pointed rods to penetrate a barrier. These piercing actuators are typically used on gas bottles and liquid tanks to initiate the flow of gas or liquid from the bottle or tank.

Rupturable barriers for use in the present invention can be fabricated of any frangible or tearable material that can withstand a pressure differential of the magnitude that will typically be encountered in a divided rocket motor when propellant is burning on one side of the barrier and not the other, and yet a material that is susceptible to rupture or weakening when receiving an impact from a squib. Preferred barriers of this type are those that are capable of maintaining their barrier function in the unactuated condition at pressure differentials of at least 1,000 psi, preferably at least 2,000 psi, and most preferably at least 5,000 psi, all at typical operating temperatures of a rocket motor, which are generally in the range of 65° F. (18° C.) to 145° F. (63° C.). Examples of materials that can meet these qualifications are stainless steel, nickel, and aluminum, with thicknesses that can be selected to achieve the desired burst pressure. Other materials will be known to those skilled in the art. For additional heat insulation, the barrier can be lined or otherwise supplemented with a layer of heat-insulating material, such as rubber or a resin. A rupturable barrier can be a disk that is either flat or pre-bulged. As noted above, the burst pattern of the barrier can be established by score lines, i.e., lines of weakness on the barrier surface. These lines can be arranged in any pattern that will promote a wide opening of the barrier when the score lines are placed under sufficient stress. In disk-shaped barriers, a radiating pattern from the center of the disk is preferred. The score lines and overall construction of the barrier are preferably selected such that the squib or other actuator when actuated will weaken the barrier sufficiently to lower the burst pressure of the barrier by at least 1,000 psi, preferably from a burst pressure of about 5,000 psi to a burst pressure of about 1,000 psi, or any decrease that will be sufficient to cause the barrier to open at pressures that are below the normal operating conditions of fore-side grain.

For embodiments that utilize a remote-controlled closure on an attitude maneuvering port, the initial condition of the closure is preferably a closed position sealing the port to prevent the escape of gases, convertible to an open position upon command from the guidance and control system during flight. Alternatively, the selection between open and closed positions can be made prior to the commencement of flight, whereupon the position selected will determine whether the fore-side propellant will be used for attitude maneuvering or for axial thrust augmentation. In either case, the barrier in these embodiments, as noted above, is sufficiently frangible that, with the attitude-maneuvering port(s) closed, the barrier will rupture upon ignition of the fore-side grain. The closures can be closures that are capable of being re-seated after having been opened, such as solenoid-operated valves, or closures that are opened by bursting, for example by squibs such as those described above.

For embodiments utilizing a hinged closure held in place by a catch or bolt, a preferred device for holding the closure in plate is an explosive bolt, which is a bolt with an explosive charge embedded in the bolt, the charge being detonable by an electrical impulse delivered from the guidance and control system. Either a fragmenting-type bolt or a non-fragmenting-type bolt can be used, both of which are known in the art and readily available from commercial suppliers. One example of such a supplier is Cartridge Actuated Devices, Inc. of Fairfield, N.J., USA.

For all barriers of the present invention, the fore-side propellant grain can serve a variety of functions when the barrier is not actuated. One example of such a function, as noted above, is thrust vector control, i.e., attitude maneuvering, by the use of divert motors that produce thrust in directions transverse to the axis of the motor. Two or more divert motors can be included, and each can consist of a nozzle oriented transverse to the axis with different nozzles directed in different directions around the periphery of the chamber. Individual actuation of these divert motors and the selection of one or more to the exclusion of the others is achieved by conventional rocket guidance and control systems. Examples of guidance and control systems are those used with space launch vehicles such as the Titan IV of Alliant Techsystems, Magna, Utah, USA, and the SCOUT (Solid Controlled Orbital Utility Test) System of NASA. Other such systems will be readily apparent to those skilled in the art. The same guidance and control systems can also be used to control the actuation of the barrier(s). As noted above, the same guidance and control system can be used to actuate the barrier.

While the features defining this invention are capable of implementation in a variety of constructions, the invention as a whole will be best understood by a detailed examination of certain specific embodiments. Several such embodiments are shown in the drawings.

Figure 2:
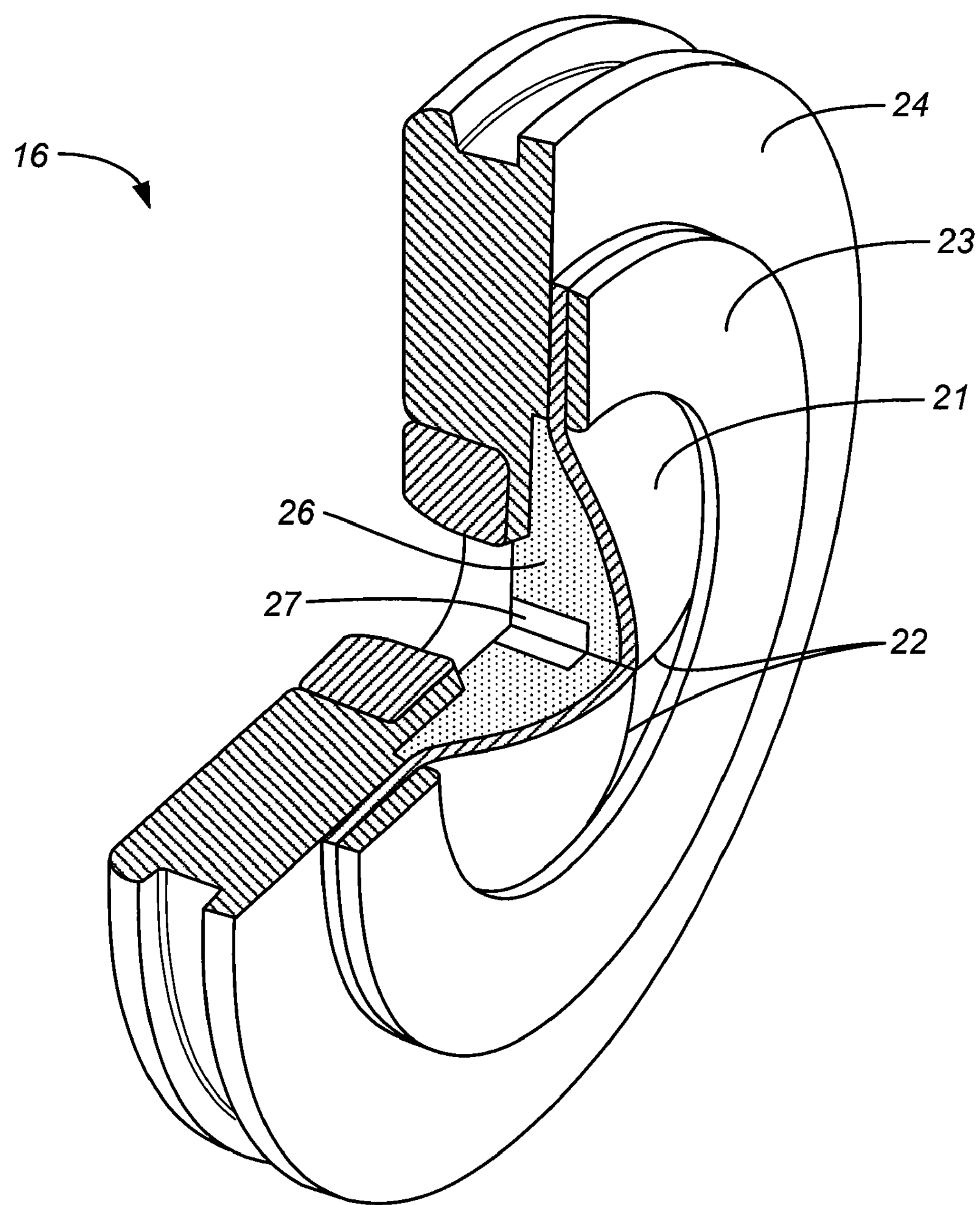
FIG. 2 is a perspective view in cutaway of the barrier assembly of the motor of FIG. 1.
Figure 3:
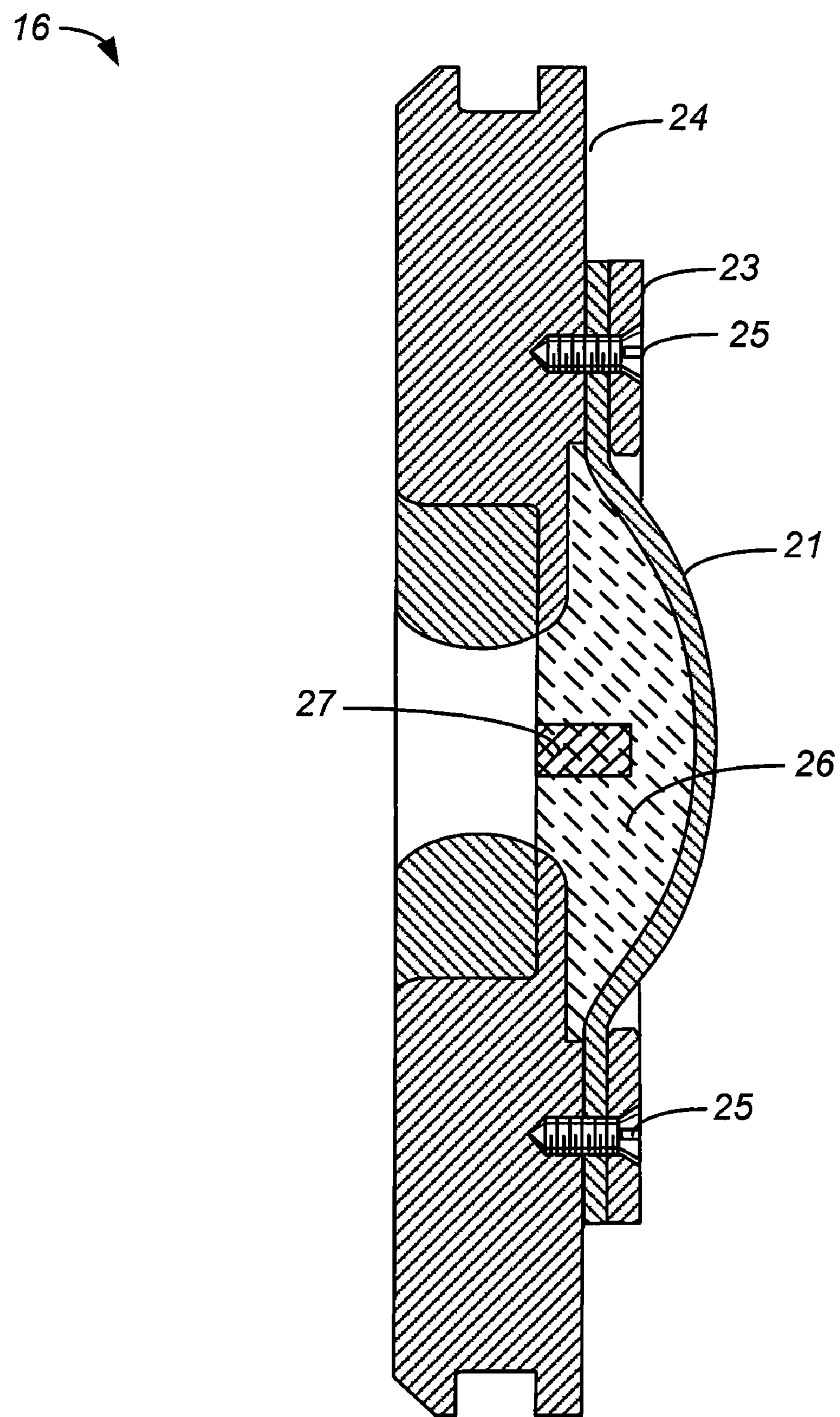
FIG. 3 is a cross section of the barrier assembly of FIGS. 1 and 2.

FIG. 1 depicts a dual-pulse rocket motor 11 with a nozzle 12 at its aft end, forward attitude control jets 13 at its fore end, and two propellant grains, a first-pulse grain 14 adjacent to the aft end and a second-pulse grain 15 adjacent to the fore end. The two grains are separated by a rupturable, thermally insulated barrier 16. The barrier 16 is actually a barrier assembly that is also shown from the aft-side perspective in a partially cut-away view in FIG. 2 and in a cross section in FIG. 3. The assembly includes a rupture disk 21 which is domed with its convex side facing the aft side of the rocket motor to enhance its ability to withstand high pressure from the aft side (i.e., from the first combustion pulse), and its concave side facing the fore side. The rupture disk 21 is scored, with score lines 22 running radially outward from the center of the disk to achieve a controlled rupture and to maximize the opening created upon rupture. The rupture disk 21 is held in place by a retaining ring 23 which in turn is secured to a support flange 24 on the inner wall of the motor case by welds 25 (FIG. 3). The rupture disk 21 is backed by a thermally insulating disk support 26 of frangible material in which is embedded a squib 27. The frangible material can either be fabricated of material that disintegrates into particles upon detonation of the squib or can be of segmented construction that separates upon detonation of the squib. The frangible material can thus be either a hard phenolic composite, a soft elastomeric material, or a high-temperature ceramic.

Figure 4:
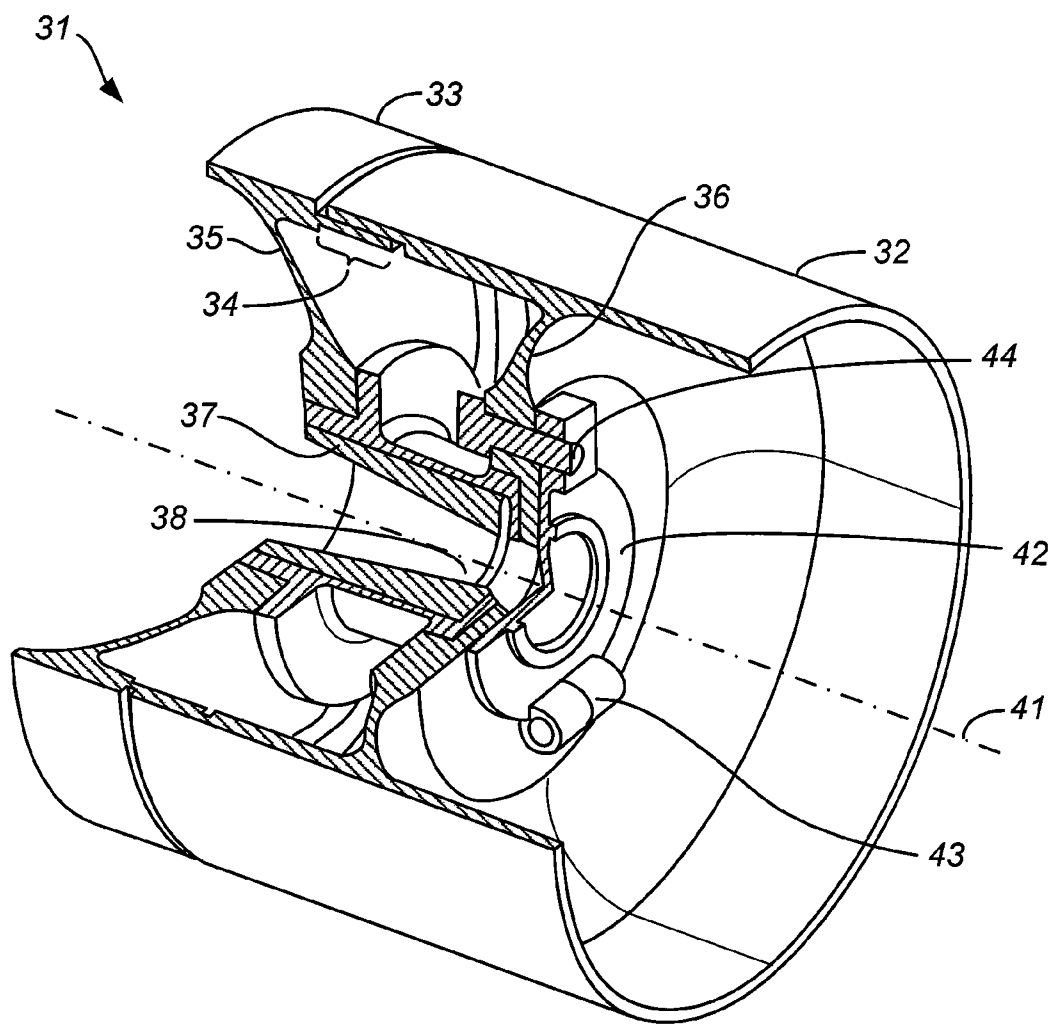
FIG. 4 is a perspective view in cutaway of a motor case for a second rocket motor within the scope of the present invention.

FIG. 4 depicts a dual-pulse rocket motor 31 utilizing a hinged barrier and explosive bolt combination to control the use of the fore-side propellant grain. Shown in the Figure are the first-pulse motor case 32 and the second-pulse motor case 33 welded together at an overlapping section 34. The two motor cases have internal flanges 35, 36 that support an insert 37 that forms a throat 38 along the common longitudinal axis 41 of the motor cases. A hinged disk 42, mounted to the first-pulse motor case flange 36 by a hinge 43, covers the throat 38 and serves as the barrier, with an explosive bolt 44 opposite the hinge 43 holding the barrier disk 42 in a closed position against the throat. Upon detonation of the bolt 44, the barrier disk 42 is free to open by rotating at the hinge 43 when pressure is applied on the fore side by ignition of the second-pulse propellant.

Figure 5:
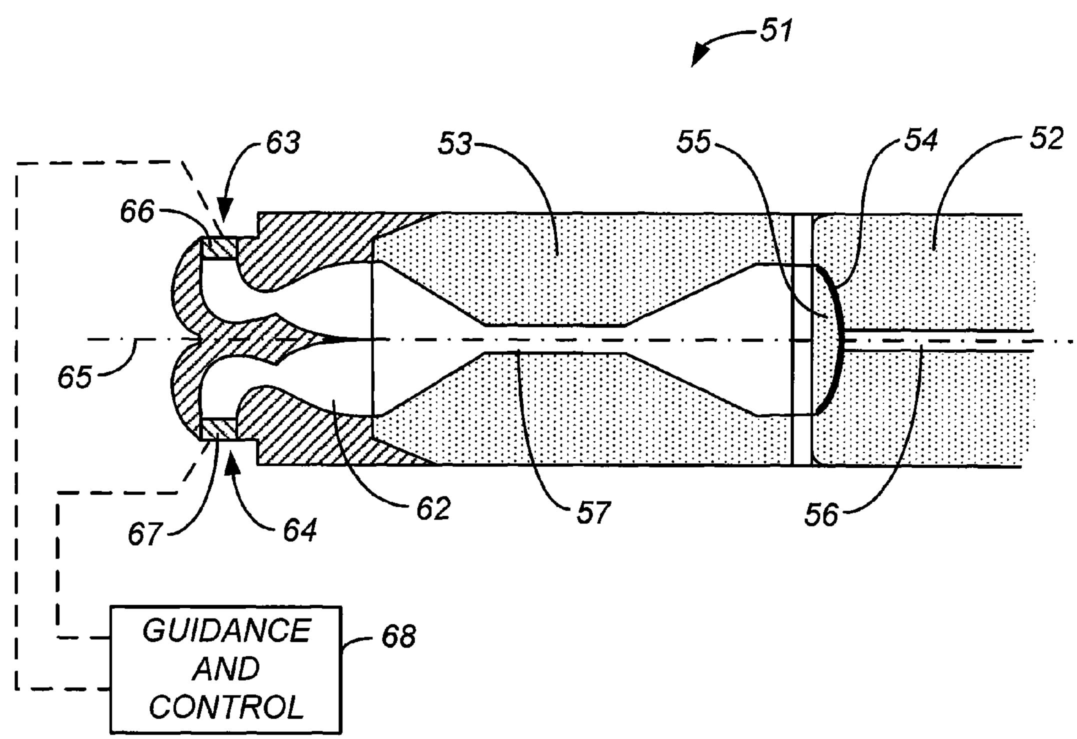
FIG. 5 is a longitudinal cross section of the fore end of a rocket motor within the scope of the present invention.

FIG. 5 depicts the fore end of a rocket motor 51 that utilizes controllable attitude maneuvering port closures to select between attitude maneuvering and a second-pulse thrust. The first-pulse propellant grain 52 is separated from the second-pulse propellant grain 53 by the thermally insulating barrier formed of a domed rupture disk 54 and a frangible backing support 55 as in FIGS. 2 and 3. While the detonators for the propellant grains are not shown, a bore 56 extends through the first-pulse grain and a second bore 57 extends through the second-pulse grain. At the fore end of the motor case, the second-pulse grain opens to two passages 61, 62, each containing a throat and each leading to an attitude maneuvering port 63, 64. The two ports are oriented in opposing directions, but both are transverse to the longitudinal axis 65 of the motor case. The ports are closed by closures 66, 67 that are releasable by the guidance and control system 68. The system thus offers a choice between two directions of attitude maneuvering. Additional directional choices can be made available by additional ports, each with its own independently operated closure.

Figure 6:
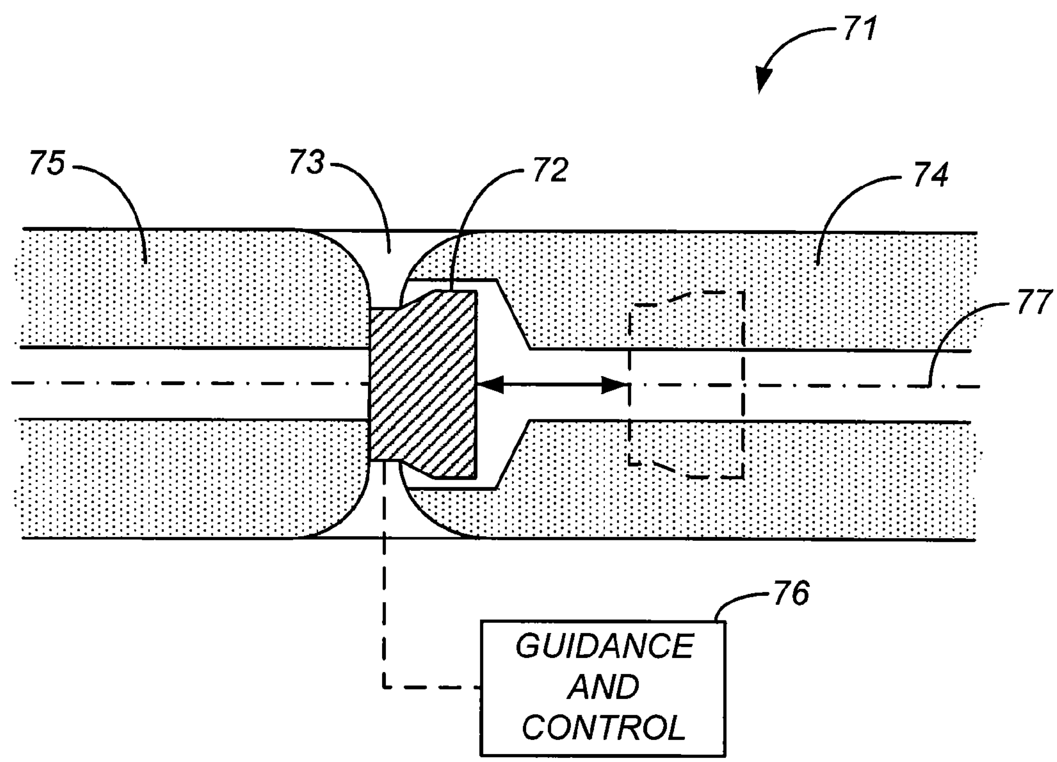
FIG. 6 is a longitudinal cross section of a still further rocket motor within the scope of the present invention.

FIG. 6 depicts a dual-pulse rocket motor 71, showing only the region of the motor that contains the barrier which in this embodiment is a movable plug 72. The two positions of the barrier are shown in solid and dashed lines, respectively, the solid lines representing the barrier in unactuated condition and the dashed lines representing the barrier in actuated condition. The opening that the barrier closes off is formed by an aperture in a disk or ring 73 that serves as a partition, and the first-pulse propellant grain 74 and the second-pulse propellant grain 75 are on aft and fore sides, respectively, of the apertured disk. In the arrangement shown, the barrier plug 72 can be moved when the aft-side propellant grain 35 (the grain on the right in the view shown) has combusted sufficiently to provide clearance. Movement of the plug 72 between the two positions is achieved by an external guidance and control system 76.

Figure 7:
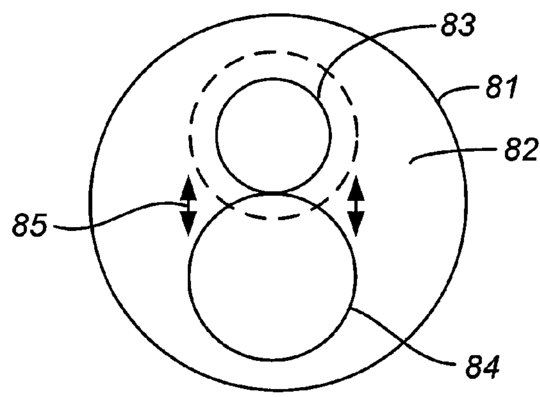
FIG. 7 is a transverse cross section of a still further rocket motor within the scope of the present invention, in which the barrier is a disk movable in the direction transverse to the motor axis.
Figure 9:
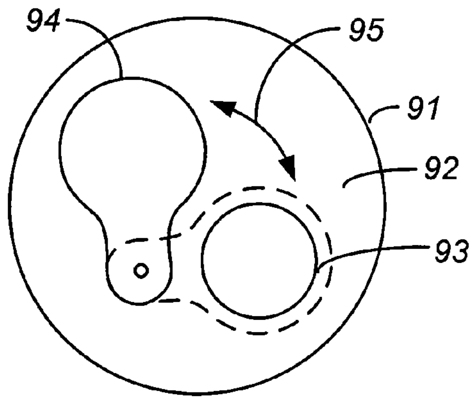
FIG. 9 is a transverse cross section of a still further rocket motor within the scope of the present invention, in which the barrier is likewise a disk movable in the direction transverse to the motor axis.
Figure 8:
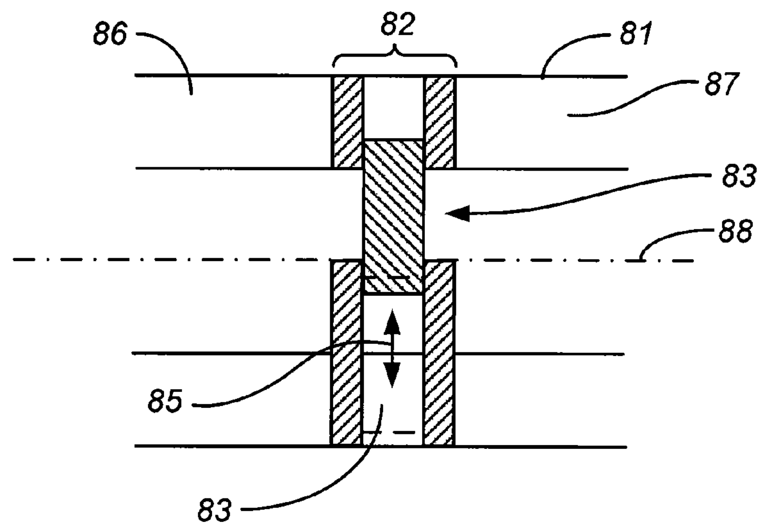
FIG. 8 is a lateral cross section of the divided rocket motor of FIG. 7.

FIGS. 7, 8, and 9 depict barrier disks that move in directions transverse to the axis of the rocket motor.

FIG. 7 is a cross section of a rocket motor 81 showing a partition 82 dividing the motor into two sections, with the fore-side grain in one section and the aft-side grain in the other. An aperture 83 in the partition 82 allows combustion gas from the propellant grains to flow between the two sections of the rocket motor. The barrier in this embodiment is a disk 84 that is movable between two positions—an open position that is represented by solid lines and leaves an open passageway through the aperture 83, and a closed position that is represented by dashed lines and closes the aperture 83. Movement of the barrier disk 84 between the two positions occurs in the direction shown by the arrow 85.

FIG. 8 is a cross section of the rocket motor 81 of FIG. 7 taken parallel to the axis of the rocket motor, showing that the partition 82 has an internal cavity 83 within which the disk 84 travels between its open and closed positions, opening and closing the aperture 83. The aft-side propellant grain 86 and the fore-side propellant grain 87 are also visible in this view.

FIG. 9 is a cross section of a rocket motor 91 showing a partition 92 similarly dividing the motor into a section containing the fore-side grain and a section containing the aft-side grain, with an aperture 93 communicating the two sections. A pivoting disk 94 is mounted to the partition for rotation between an open position that is represented by the solid lines and leaves an open passageway through the aperture 93, and a closed position that is represented by dashed lines and closes the aperture 93. Movement of the disk 94 occurs along the direction indicated by the arrow 95. In the embodiments of both FIGS. 7 and 9, movement of each disk is controlled by the same type of guidance and control system used in the embodiments of the preceding Figures.

The embodiments depicted in the drawings are dual-pulse rocket motors. Rocket motors designed for three or more pulses can be configured analogously by installing two or more barriers or barrier assemblies of the types shown in the Figures at locations spaced along the axis 17 (FIG. 1), 41 (FIG. 4), 65 (FIG. 5), 76 (FIG. 6), or 88 (FIG. 8) of the rocket motor.

While the foregoing description describes various alternatives of rocket motors within the scope of this invention, still further alternatives will be apparent to those who are skilled in the art and are likewise within the scope of the invention.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What we claim is:

1. A multi-purpose rocket motor comprising:

(a) a chamber having a longitudinal axis terminating at a fore end and an aft end, and comprising a nozzle at said aft end, (b) a thermally insulating barrier dividing said chamber into fore and aft segments arranged along said longitudinal axis, with a fore propellant grain in said fore segment and an aft propellant grain in said aft segment, (c) an attitude maneuvering port in said fore segment oriented to produce attitude maneuvering of said rocket motor; and (d) a guidance and control system selecting between a first mode of operation wherein said barrier is in a closed condition, causing combustion gas from combustion of said fore propellant grain to be released from said chamber through said attitude maneuvering port, and a second mode of operation wherein said barrier is in an open condition permitting flow of combustion gas generated in said fore segment through said aft segment to achieve combined axial thrust from said fore and aft propellant grains when combusted, said guidance and control system being independent of ignition of either said fore propellant grain or said aft propellant grain, and wherein said barrier is sufficiently frangible to rupture to said open condition upon ignition of said fore propellant grain when said attitude maneuvering port is closed.

2. The multi-purpose rocket of claim 1 wherein said thermally insulating barrier comprises a rupture disk facing said aft segment of said chamber and a frangible support member facing said fore segment of said chamber.

3. A multi-purpose rocket motor comprising:

(a) a chamber having a longitudinal axis terminating at a fore end and an aft end, and comprising a nozzle at said aft end, (b) a thermally insulating barrier dividing said chamber into fore and aft segments arranged along said longitudinal axis, with a fore propellant grain in said fore segment and an aft propellant grain in said aft segment, (c) an attitude maneuvering port in said fore segment oriented to produce attitude maneuvering of said rocket motor; and a guidance and control system selecting between a first mode of operation wherein said barrier is in a closed condition, causing combustion gas from combustion of said fore propellant grain to be released from said chamber through said attitude maneuvering port, and a second mode of operation wherein said barrier is in an open condition permitting flow of combustion gas generated in said fore segment through said aft segment to achieve combined axial thrust from said fore and aft propellant grains when combusted, said guidance and control system being independent of ignition of either said fore propellant grain or said aft propellant grain, and wherein said barrier contains score lines to control rupture of said barrier and to provide said barrier with a burst pressure that is lower by at least 1,000 psi due to inclusion of said score lines.

4. The multi-purpose rocket of claim 3, wherein score lines lower said burst pressure from about 5,000 psi to about 1,000 psi.

* * * * *